United States Patent
Moreso et al.

(10) Patent No.: US 12,391,777 B2
(45) Date of Patent: Aug. 19, 2025

(54) TERPOLYMER OF ETHYLENE AND 1,3-DIENES

(71) Applicant: COMPAGNIE GENERALE DES ETABLISSEMENTS MICHELIN, Clermont-Ferrand (FR)

(72) Inventors: Emma Moreso, Clermont-Ferrand (FR); Vincent Lafaquiere, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 825 days.

(21) Appl. No.: 17/641,931

(22) PCT Filed: Sep. 17, 2020

(86) PCT No.: PCT/EP2020/075933
§ 371 (c)(1),
(2) Date: Aug. 17, 2022

(87) PCT Pub. No.: WO2021/053051
PCT Pub. Date: Mar. 25, 2021

(65) Prior Publication Data
US 2022/0389136 A1  Dec. 8, 2022

(30) Foreign Application Priority Data
Sep. 18, 2019  (FR) .................... 1910303

(51) Int. Cl.
*C08F 210/02* (2006.01)
*B60C 1/00* (2006.01)
*C08F 4/54* (2006.01)
*C08F 236/06* (2006.01)
*C08F 236/22* (2006.01)

(52) U.S. Cl.
CPC .............. *C08F 210/02* (2013.01); *B60C 1/00* (2013.01); *C08F 4/545* (2013.01); *C08F 236/06* (2013.01); *C08F 236/22* (2013.01); *C08F 2420/00* (2013.01); *C08F 2500/36* (2021.01); *C08F 2800/10* (2013.01)

(58) Field of Classification Search
CPC .... C08F 210/02; C08F 236/06; C08F 236/22; C08F 4/54; B60C 1/00
USPC .......................................................... 523/156
See application file for complete search history.

(56) References Cited

U.S. PATENT DOCUMENTS

| | | |
|---|---|---|
| 2007/0053334 A1 | 3/2007 | Sueyoshi et al. |
| 2015/0038657 A1* | 2/2015 | Washizu ............... C08F 236/22 526/173 |
| 2018/0371129 A1 | 12/2018 | Pacheco et al. |
| 2020/0040170 A1 | 2/2020 | Araujo Da Silva et al. |
| 2020/0157259 A1 | 5/2020 | Visseaux et al. |
| 2021/0054118 A1 | 2/2021 | Lafaquiere et al. |

FOREIGN PATENT DOCUMENTS

| | | | |
|---|---|---|---|
| FR | 3060007 A1 * | 6/2018 | ............... B60C 1/00 |
| JP | 4028950 B2 | 7/2001 | |
| JP | 4616732 B2 | 1/2011 | |
| JP | 2019504148 A | 2/2019 | |
| WO | 2018189456 A1 | 10/2018 | |
| WO | 2019012009 A1 | 1/2019 | |
| WO | 2019180356 A1 | 9/2019 | |

OTHER PUBLICATIONS

International Search Report and Written Opinion, with English translation, mailed Dec. 1, 2020 for International Application No. PCT/EP2020/075933, 10 pages.

* cited by examiner

Primary Examiner — Deve V Hall
(74) Attorney, Agent, or Firm — Dickinson Wright PLLC

(57) ABSTRACT

A terpolymer of ethylene, of a first 1,3-diene having from 4 to 6 carbon atoms and of a second 1,3-diene of formula $CH_2=CR-CH=CH_2$ is provided. The terpolymer contains more than 50 mol % of ethylene units and at least 1 mol % of units of the second 1,3-diene, the symbol R representing a hydrocarbon chain having from 3 to 20 carbon atoms. Such a polymer gives an improved compromise between its ethylene content, its stiffness and its degree of crystallinity for use in tires.

17 Claims, No Drawings

TERPOLYMER OF ETHYLENE AND 1,3-DIENES

CROSS-REFERENCE TO RELATED APPLICATIONS

This U.S. national phase patent application claims priority to and the benefit of International Patent Application No. PCT/EP2020/075933, filed on Sep. 17, 2020, which claims priority to and the benefit of French patent application No. FR1910303, filed Sep. 18, 2019, the contents of which are incorporated herein by reference in their entirety.

BACKGROUND

1. Technical Field

The field of the invention is that of copolymers of conjugated dienes and of ethylene, rich in ethylene unit and usable as elastomers in a rubber composition for tires.

2. Related Art

The most widely used diene elastomers in the manufacture of tires are polybutadienes, polyisoprenes, in particular natural rubber, and copolymers of 1,3-butadiene and of styrene. The point common to these elastomers is the high molar proportion of diene units in the elastomer, generally much greater than 50%, which can render them sensitive to oxidation, in particular under the action of ozone.

The Applicant Company has described elastomers which, on the contrary, are relatively poor in diene units, in particular for the purpose of reducing their sensitivity to oxidation phenomena. These elastomers are, for example, described in the document WO 2007054223. These are copolymers of 1,3-butadiene and of ethylene containing more than 50 mol % of ethylene unit. These elastomers are described as ethylene-rich diene elastomers.

Ethylene-rich copolymers of 1,3-butadiene and of ethylene are crystalline and experience an increase in their crystallinity with the content of ethylene. The presence of crystalline parts in the copolymer can be problematic when the copolymer is used in a rubber composition. As the melting of the crystalline parts of the copolymer leads to a drop in its stiffness, a rubber composition containing such a copolymer also experiences a decrease in its stiffness when it is brought to temperatures equal to or exceeding the melting point of the crystalline parts. This dependence of the stiffness as a function of the temperature can thus lead to fluctuations in the properties of the rubber composition and make it less suitable for certain uses which require better temperature stability of the properties. It is advantageous to have available diene polymers rich in ethylene units, the crystallinity of which is reduced, indeed even eliminated.

In the document WO 2007054224, the Applicant Company has described ethylene-rich diene copolymers which exhibit a reduced crystallinity. These copolymers are copolymers of 1,3-butadiene and of ethylene which additionally contain saturated 6-membered cyclic hydrocarbon motifs. Nevertheless, these copolymers introduced into a rubber composition can confer an excessively high stiffness on the rubber composition. The high stiffness of the rubber composition is attributed to an equally high stiffness of the elastomer. A high stiffness of a rubber composition can be problematic as it can itself also render the rubber composition unsuitable for certain applications.

SUMMARY

On pursuing its aim of synthesizing ethylene-rich diene elastomers, the Applicant Company has discovered a novel polymer which makes it possible to solve the problems mentioned, in particular by exhibiting an improved compromise between the ethylene content, the stiffness and the degree of crystallinity for use in tires.

Thus, a first subject-matter of the invention is a terpolymer, preferably an elastomer, of ethylene, of a first 1,3-diene having from 4 to 6 carbon atoms and of a second 1,3-diene of formula (I), which terpolymer contains more than 50 mol % of ethylene units and at least 1 mol % of units of the second 1,3-diene, $$CH_2=CR\text{-}CH=CH_2 \qquad (I)$$

the symbol R representing a hydrocarbon chain having from 3 to 20 carbon atoms.

A second subject-matter of the invention is a process for preparing the terpolymer in accordance with the invention.

The invention also relates to a rubber composition comprising a terpolymer in accordance with the invention, a reinforcing filler and a crosslinking system, which terpolymer is an elastomer.

The invention also relates to a tire which comprises a rubber composition in accordance with the invention.

DETAILED DESCRIPTION OF EXAMPLE EMBODIMENTS

Any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b). The abbreviation "phr" means parts by weight per hundred parts by weight of elastomer (of the total of the elastomers if several elastomers are present).

The expression "based on" used to define the constituents of a catalytic system or of a composition is understood to mean the mixture of these constituents, or the product of the reaction of a portion or of all of these constituents with one another.

Unless otherwise indicated, the contents of the units resulting from the insertion of a monomer into a copolymer are expressed as molar percentage with respect to all of the monomer units of the copolymer.

The compounds mentioned in the description can be of fossil origin or be biobased. In the latter case, they can partially or completely result from biomass or be obtained from renewable starting materials resulting from biomass. Elastomers, plasticizers, fillers and the like are concerned in particular.

The essential characteristic of the first 1,3-diene is that it contains from 4 to 6 carbon atoms. The first 1,3-diene is just one compound, that is to say just one 1,3-diene having from 4 to 6 carbon atoms, or is a mixture of different 1,3-dienes having from 4 to 6 carbon atoms. Mention may in particular be made, as 1,3-diene having from 4 to 6 carbon atoms, of 1,3-butadiene and isoprene. The first 1,3-diene is preferentially 1,3-butadiene.

The essential characteristic of the second 1,3-diene is that it corresponds to the formula (I) in which the symbol R represents a hydrocarbon chain having from 3 to 20 carbon atoms.

$$CH_2=CR\text{-}CH=CH_2 \qquad (I)$$

The second 1,3-diene is just one compound, that is to say just one 1,3-diene of formula (I), or is a mixture of 1,3-dienes of formula (I), the 1,3-dienes of the mixture differing from one another in the group represented by the symbol R.

Preferably, the symbol R represents a hydrocarbon chain having from 6 to 16 carbon atoms. The hydrocarbon chain represented by the symbol R can be a saturated or unsaturated chain. Preferably, the symbol R represents an aliphatic chain, in which case, in the formula (I) of the 1,3-diene, the hydrocarbon chain represented by the symbol R is an aliphatic hydrocarbon chain. It can be a linear or branched chain, in which case the symbol R represents a linear or branched chain. Preferably, the hydrocarbon chain is acyclic, in which case the symbol R represents an acyclic chain. Better still, the symbol R represents an unsaturated and branched acyclic hydrocarbon chain. The hydrocarbon chain represented by the symbol R is advantageously an unsaturated and branched acyclic chain containing from 3 to 20 carbon atoms, in particular from 6 to 16 carbon atoms. Very advantageously, the 1,3-diene is myrcene or β-farnesene. According to a preferential embodiment of the invention, the 1,3-diene is myrcene.

According to another preferential embodiment of the invention, the 1,3-diene is β-farnesene.

The terpolymer in accordance with the invention is a terpolymer of ethylene, of a first 1,3-diene and of a second 1,3-diene, which implies that the monomer units of the terpolymer are units resulting from the polymerization of ethylene, the first 1,3-diene and the second 1,3-diene. The copolymer thus comprises ethylene units, units of the first 1,3-diene and units of the second 1,3-diene.

Since the second 1,3-diene is a substituted 1,3-diene, its polymerization can give rise to units of 1,2 configuration represented by the formula (1), of 3,4 configuration represented by the formula (2) and of 1,4 configuration, the trans form of which is represented below by the formula (3).

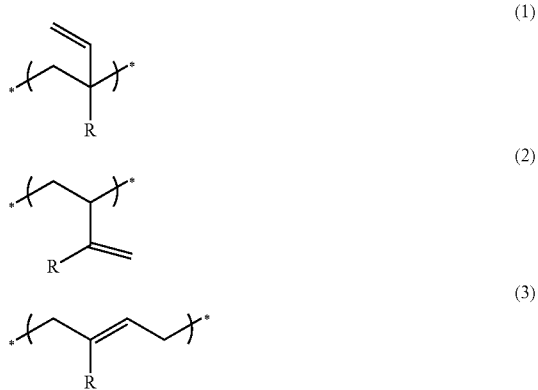

In a well known way, the first 1,3-diene can give rise to 1,3-diene units which are units of 1,2 or 3,4 configuration, as is the case, for example, for isoprene, and units of 1,4 configuration.

In an also well known way, the ethylene unit is a unit of —(CH$_2$-CH$_2$)— motif.

The terpolymer in accordance with the invention is advantageously a statistical terpolymer according to any one of the embodiments of the invention. Very advantageously, the terpolymer is an atactic polymer according to any one of the embodiments of the invention.

According to the invention, the terpolymer contains more than 50 mol % of ethylene units. Preferably, the terpolymer contains more than 60 mol % of ethylene units. More preferentially, it contains at least 70 mol % of ethylene units.

The terpolymer preferentially contains at most 90 mol % of ethylene units, more preferentially at most 85 mol % of ethylene units.

According to the invention, the terpolymer contains at least 1 mol % of units of the second 1,3-diene. Preferably, the terpolymer contains at most 20 mol % of units of the second 1,3-diene. More preferentially, the terpolymer contains at most 10 mol % of units of the second 1,3-diene.

According to one embodiment of the invention, the terpolymer contains more than 60 mol % to 90 mol % of ethylene units and from 1 mol % to 20 mol %, preferentially from 1 mol % to 10 mol %, of units of the second 1,3-diene. According to this embodiment of the invention, the terpolymer preferentially contains less than 30 mol % of units of the first 1,3-diene or preferentially contains less than 20 mol % of units of the first 1,3-diene.

According to another embodiment of the invention, the terpolymer contains from 70 mol % to 90 mol % of ethylene units and from 1 mol % to 20 mol %, preferentially from 1 mol % to 10 mol %, of units of the second 1,3-diene. According to this embodiment of the invention, the terpolymer preferentially contains less than 20 mol % of units of the first 1,3-diene.

According to yet another embodiment of the invention, the terpolymer contains more than 60 mol % to 85 mol % of ethylene units and from 1 mol % to 20 mol %, preferentially from 1 mol % to 10 mol %, of units of the second 1,3-diene. According to this embodiment of the invention, the terpolymer preferentially contains less than 30 mol % of units of the first 1,3-diene or preferentially contains less than 20 mol % of units of the first 1,3-diene.

According to yet another embodiment of the invention, the terpolymer contains from 70 mol % to 85 mol % of ethylene units and from 1 mol % to 20 mol %, preferentially from 1 mol % to 10 mol %, of units of the second 1,3-diene. According to this embodiment of the invention, the terpolymer preferentially contains less than 20 mol % of units of the first 1,3-diene.

According to any one of the embodiments of the invention, the terpolymer preferentially contains less than 80 mol % of ethylene unit, more preferentially at most 75 mol % of ethylene unit.

According to a specific embodiment of the invention, in particular when the first 1,3-diene is 1,3-butadiene or a mixture of 1,3-dienes, one of which is 1,3-butadiene, the terpolymer additionally contains units of 1,2-cyclohexanediyl motif. The presence of these cyclic structures in the terpolymer results from a very specific insertion of the ethylene and 1,3-butadiene during the polymerization. The content of units of 1,2-cyclohexanediyl motif in the terpolymer varies according to the respective contents of ethylene and of 1,3-butadiene in the terpolymer. The terpolymer preferably contains less than 15 mol % of units of 1,2-cyclohexanediyl motif.

Preferably, the terpolymer in accordance with the invention has a glass transition temperature of less than −35° C., preferentially of between −70° C. and −35° C.

The terpolymer can be prepared by a process, which is another subject-matter of the invention, which comprises the polymerization of a mixture of ethylene, of the first 1,3-diene and of the second 1,3-diene in the presence of a catalytic system based at least on a metallocene of formula (II) and on an organomagnesium compound of formula (III)

Cp$^1$ and Cp$^2$, which are identical or different, being selected from the group consisting of the cyclopentadienyl group of formula C$_5$H$_4$, the unsubstituted fluorenyl group of formula C$_{13}$H$_8$ and substituted fluorenyl groups, P being a group bridging the two Cp$^1$ and Cp$^2$ groups and representing a ZR$^3$R$^4$ group, Z representing a silicon or carbon atom, R$^3$ and R$^4$, which are identical or different, each representing an alkyl group comprising from 1 to 20 carbon atoms, preferably a methyl, y, which is an integer, being equal to or greater than 0, x, which is or is not an integer, being equal to or greater than 0, L representing an alkali metal selected from the group consisting of lithium, sodium and potassium, N representing a molecule of an ether, preferably diethyl ether or tetrahydrofuran, R$^1$ and R$^2$, which are identical or different, representing a carbon group.

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the position of the carbon atoms of the rings as represented in the scheme below, the 9 position corresponding to the carbon atom to which the bridge P is attached.

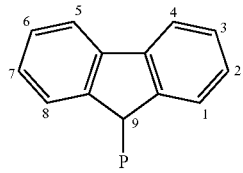

The catalytic system can be prepared conventionally by a process analogous to that described in Patent Application WO 2007054224 or WO 2007054223. For example, the organomagnesium compound and the metallocene are reacted in a hydrocarbon solvent typically at a temperature ranging from 20° C. to 80° C. for a period of time of between 5 and 60 minutes. The catalytic system is generally prepared in an aliphatic hydrocarbon solvent, such as methylcyclohexane, or an aromatic hydrocarbon solvent, such as toluene. Generally, after its synthesis, the catalytic system is used in this form in the process for the synthesis of the polymer in accordance with the invention.

Alternatively, the catalytic system can be prepared by a process analogous to that described in Patent Application WO 2017093654 A1 or in Patent Application WO 2018020122 A1.

According to this alternative, the catalytic system additionally contains a preformation monomer chosen from a conjugated diene, ethylene or a mixture of ethylene and of a conjugated diene, in which case the catalytic system is based at least on the metallocene, the organomagnesium compound and the preformation monomer. For example, the organomagnesium compound and the metallocene are reacted in a hydrocarbon solvent typically at a temperature of from 20° C. to 80° C. for 10 to 20 minutes in order to obtain a first reaction product, then the preformation monomer, chosen from a conjugated diene, ethylene or a mixture of ethylene and of a conjugated diene, is reacted with this first reaction product at a temperature ranging from 40° C. to 90° C. for 1 h to 12 h. The catalytic system thus obtained can be used immediately in the process in accordance with the invention or be stored under an inert atmosphere before it is used in the process in accordance with the invention.

The metallocene used for preparing the catalytic system can be in the form of a crystalline or non-crystalline powder, or else in the form of single crystals. The metallocene can be provided in a monomer or dimer form, these forms depending on the method of preparation of the metallocene, as for example is described in Patent Application WO 2007054224 or WO 2007054223. The metallocene can be prepared conventionally by a process analogous to that described in Patent Application WO 2007054224 or WO 2007054223, in particular by reaction, under inert and anhydrous conditions, of the salt of an alkali metal of the ligand with a rare earth metal borohydride in a suitable solvent, such as an ether, for example diethyl ether or tetrahydrofuran, or any other solvent known to a person skilled in the art. After reaction, the metallocene is separated from the reaction by-products by techniques known to a person skilled in the art, such as filtration or precipitation from a second solvent. In the end, the metallocene is dried and isolated in solid form.

Like any synthesis carried out in the presence of an organometallic compound, the synthesis of the metallocene and that of the catalytic system take place under anhydrous conditions under an inert atmosphere. Typically, the reactions are carried out starting from anhydrous solvents and compounds under anhydrous nitrogen or argon.

The organomagnesium compound of use for the requirements of the invention is of formula MgR$^1$R$^2$, in which R$^1$ and R$^2$, which are identical or different, represent a carbon group. Carbon group is understood to mean a group which contains one or more carbon atoms. Preferably, R$^1$ and R$^2$ contain from 2 to 10 carbon atoms. More preferentially, R$^1$ and R$^2$ each represent an alkyl. The organomagnesium compound is advantageously a dialkylmagnesium compound, better still butylethylmagnesium or butyloctylmagnesium, even better still butyloctylmagnesium.

According to any one of the embodiments of the invention, the molar ratio of the organomagnesium compound to the metal Nd constituting the metallocene is preferably within a range extending from 1 to 100, more preferentially is greater than or equal to 1 and less than 10. The range of values extending from 1 to less than 10 is in particular more favourable for obtaining polymers of high molar masses.

When the terpolymer is a polymer which comprises units of 1,2-cyclohexanediyl motif, it is prepared according to the process mentioned in the present patent application using a metallocene of formula (II) in which Cp$^1$ and Cp$^2$, which are identical or different, are selected from the group consisting of substituted fluorenyl groups and the unsubstituted fluorenyl group of formula C$_{13}$H$_8$. For this alternative form, the metallocenes of the following formulae, in which the symbol Flu presents the fluorenyl group of formula C$_{13}$H$_8$: [{Me$_2$SiFlu$_2$Nd(μ-BH$_4$)$_2$Li(THF)}$_2$]; [Me$_2$SiFlu$_2$Nd(μ-

BH$_4$)$_2$Li(THF)]; [Me$_2$SiFlu$_2$Nd(μ-BH$_4$)(THF)]; [{Me$_2$SiFlu$_2$Nd(μ-BH$_4$)(THF)}$_2$]; [Me$_2$SiFlu$_2$Nd(μ-BH$_4$)], are particularly suitable.

A person skilled in the art also adapts the polymerization conditions and the concentrations of each of the reactants (constituents of the catalytic system, monomers) according to the equipment (devices, reactors) used to carry out the polymerization and the various chemical reactions. As is known to a person skilled in the art, the polymerization and also the handling of the monomers, of the catalytic system and of the polymerization solvent(s) take place under anhydrous conditions and under an inert atmosphere. The polymerization solvents are typically aliphatic or aromatic hydrocarbon solvents.

The polymerization is preferably carried out in solution, continuously or batchwise. The polymerization solvent can be an aromatic or aliphatic hydrocarbon solvent. Mention may be made, as examples of polymerization solvent, of toluene and methylcyclohexane. The monomers can be introduced into the reactor containing the polymerization solvent and the catalytic system or, conversely, the catalytic system can be introduced into the reactor containing the polymerization solvent and the monomers. The copolymerization is typically carried out under anhydrous conditions and in the absence of oxygen, in the optional presence of an inert gas. The polymerization temperature generally varies within a range extending from 30° C. to 150° C., preferentially from 30° C. to 120° C. Preferably, the copolymerization is carried out at constant ethylene pressure.

During the polymerization of ethylene and 1,3-dienes in a polymerization reactor, ethylene and 1,3-dienes can be added continuously to the polymerization reactor, in which case the polymerization reactor is a fed reactor. This embodiment is very particularly suitable for the synthesis of a statistical terpolymer.

The polymerization can be stopped by cooling the polymerization medium or by addition of an alcohol. The polymer can be recovered according to conventional techniques known to a person skilled in the art, such as, for example, by precipitation, by evaporation of the solvent under reduced pressure or by steam stripping.

Alternatively, instead of adding an alcohol, it is possible to add a functionalizing agent, in which case a polymer bearing a functional group, such as an amine functional group, a silanol functional group or an alkoxysilane functional group, is recovered. According to a specific embodiment of the invention, the terpolymer bears an amine, alkoxysilane or silanol functional group.

According to a first alternative form in which the functional group borne by the polymer is an amine functional group, the functionalizing agent is preferably a compound of formula (IV),

$$\text{Si}(Fc^1)_{3-g}(Rc^2)_g(Rca) \tag{IV}$$

the symbols Fc$^1$, which are identical or different, representing an alkoxy group, the symbols Rc$^2$, which are identical or different, representing a hydrogen atom or a hydrocarbon chain, the symbol Rca representing a hydrocarbon chain substituted by an amine functional group, g being an integer ranging from 0 to 1.

The alkoxy group represented by the symbol Fc$^1$ in the formula (IV) is preferably methoxy or ethoxy.

The amine functional group designated in the symbol Rca in the formula (IV), namely the amine functional group of the functionalizing agent, is a protected primary amine functional group, a protected secondary amine functional group or a tertiary amine functional group. Mention may be made, as protective groups for the primary amine and secondary amine functional groups, of silyl groups, for example the trimethylsilyl and tert-butyldimethylsilyl groups. Preferably, the amine functional group of the functionalizing agent is a tertiary amine functional group. Advantageously, the amine functional group of the functionalizing agent is a tertiary amine of formula —N(R$_B$)$_2$ in which each R$_B$ represents an alkyl, preferentially a methyl or an ethyl.

Mention may be made, as functionalizing agent for preparing a polymer bearing an amine functional group according to the first alternative form, of the compounds (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, (N,N-dimethylaminopropyl)trimethoxysilane, (N,N-dimethylaminopropyl)triethoxysilane, (N-(3-trimethoxysilyl)propyl)-N-(trimethylsilyl)silanamine and (N-(3-triethoxysilyl)propyl)-N-(trimethylsilyl)silanamine, preferably (N,N-dimethyl-3-aminopropyl)methyldimethoxysilane, (N,N-dimethyl-3-aminopropyl)ethyldimethoxysilane, (N,N-dimethylaminopropyl)trimethoxysilane and (N-(3-trimethoxysilyl)propyl)-N-(trimethylsilyl)silanamine, more preferably (N,N-dimethylaminopropyl)trimethoxysilane and (N-(3-trimethoxysilyl)propyl)-N-(trimethylsilyl)silanamine.

According to a second alternative form in which the functional group borne by the polymer is a silanol or alkoxysilane functional group, the functionalizing agent is preferably a compound of formula (V),

$$\text{Si}(Fc^1)_{4-g}(Rc^2)_g \tag{V}$$

the symbols Fc$^1$, which are identical or different, representing an alkoxy group or a halogen atom, the symbols Rc$^2$, which are identical or different, representing a hydrogen atom, a hydrocarbon chain or a hydrocarbon chain substituted by a chemical functional group Fc$^2$, g being an integer ranging from 0 to 2.

When the symbol Fc$^1$ represents an alkoxy group in the formula (V), the alkoxy group is preferably methoxy or ethoxy. When the symbol Fc$^1$ represents a halogen atom in the formula (V), the halogen atom is preferably chlorine.

Mention may be made, among the hydrocarbon chains represented by the symbols Rc$^2$ in the formula (V), of alkyls, preferably alkyls having at most 6 carbon atoms, more preferentially methyl or ethyl, better still methyl.

Mention may be made, among the hydrocarbon chains substituted by a chemical functional group Fc$^2$ which are represented by the symbols Rc$^2$ in the formula (V), of alkanediyl chains, preferably those comprising at most 6 carbon atoms, more preferentially the 1,3-propanediyl group, the alkanediyl group bearing a substituent, the chemical functional group Fc$^2$, in other words one valency of the alkanediyl chain for the functional group Fc$^2$, the other valency for the silicon atom of the methoxysilane functional group.

In the formula (V), the term "chemical functional group" is understood to mean a group which is different from a saturated hydrocarbon group and which can participate in chemical reactions. A person skilled in the art understands that the chemical functional group Fc$^2$ in the formula (V) is a group chemically inert with respect to the chemical entities present in the polymerization medium. The chemical functional group Fc$^2$ in the formula (V) can be in a protected form, such as, for example, in the case of the primary amine, secondary amine or thiol functional group. Mention may be made, as chemical functional group $Fc^2$, of the ether, thioether, protected primary amine, protected secondary amine, tertiary amine, protected thiol or silyl functional groups. Preferably, the chemical functional group $Fc^2$ in the formula (V) is a protected primary amine functional group, a protected secondary amine functional group, a tertiary amine functional group or a protected thiol functional group. Mention may be made, as protective groups for the primary amine, secondary amine and thiol functional groups, of silyl groups, for example the trimethylsilyl and tert-butyldimethylsilyl groups.

Mention may be made, as functionalizing agent for preparing a polymer bearing a silanol or alkoxysilane functional group according to the second alternative form, of the compounds dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethylsilyl)silanamine and 3,3-dimethoxy-8,8,9,9-tetramethyl-2-oxa-7-thia-3,8-disiladecane, preferably dimethoxydimethylsilane, dimethoxydiethylsilane, (N,N-dimethyl-3-aminopropyl)methyldimethoxysilane, (N,N-dimethyl-3-aminopropyl)ethyldimethoxysilane, 3-methoxy-3,8,8,9,9-pentamethyl-2-oxa-7-thia-3,8-disiladecane, trimethoxymethylsilane, trimethoxyethylsilane, (N,N-dimethylaminopropyl)trimethoxysilane, (N-(3-trimethoxysilyl)propyl)-N-(trimethylsilyl)silanamine and 3,3-dimethoxy-8,8,9,9-tetramethyl-2-oxa-7-thia-3,8-disiladecane, more preferentially trimethoxymethylsilane, trimethoxyethylsilane, (N,N-dimethylaminopropyl)trimethoxysilane, (N-(3-trimethoxysilyl)propyl)-N-(trimethylsilyl)silanamine and 3,3-dimethoxy-8,8,9,9-tetramethyl-2-oxa-7-thia-3,8-disiladecane.

Whether it is the first or the second alternative form, the functionalizing agent is typically added to the polymerization medium. It is typically added to the polymerization medium at a degree of conversion of the monomers chosen by a person skilled in the art according to the desired macrostructure of the copolymer. As the polymerization stage is generally carried out under ethylene pressure, a degassing of the polymerization reactor can be carried out before the addition of the functionalizing agent. The functionalizing agent is added under inert and anhydrous conditions to the polymerization medium, maintained at the polymerization temperature. Use is typically made of from 0.25 to 10 mol of functionalizing agent per 1 mol of cocatalyst, preferably of from 2 to 4 mol of functionalizing agent per 1 mol of cocatalyst. The functionalizing agent is brought into contact with the polymerization medium for a time sufficient to make possible the functionalization reaction. This contact time is judiciously chosen by a person skilled in the art as a function of the concentration of the reaction medium and of the temperature of the reaction medium. Typically, the functionalization reaction is carried out under stirring, at a temperature ranging from 17° C. to 80° C., for from 0.01 to 24 hours.

When the functionalizing agent bears a protected functional group as described above, the stage of functionalization of the polymer can be followed by a hydrolysis reaction in order to form a copolymer bearing a deprotected functional group, such as a primary amine, a secondary amine or a thiol functional group.

A hydrolysis reaction can also follow the reaction for functionalization of the polymer when the functionalization reaction leads to the formation of a polymer bearing an alkoxysilane functional group. The hydrolysis of the polymer bearing an alkoxysilane functional group leads to the preparation of a polymer bearing a silanol functional group.

The terpolymer in accordance with the invention, described according to any one of the embodiments of the invention, including under their preferential alternative forms, exhibits both a lower stiffness and a comparable, indeed even lower, degree of crystallinity than a copolymer of ethylene and 1,3-butadiene which nevertheless exhibits the same ethylene content. The substitution in a rubber composition of the terpolymer in accordance with the invention for a copolymer of ethylene and 1,3-butadiene which nevertheless exhibits the same ethylene content makes it possible to confer, on a rubber composition, a lower stiffness. The terpolymer in accordance with the invention is advantageously an elastomer. It is in particular intended to be used in a rubber composition, in particular for tires.

The rubber composition, which is another subject-matter of the invention, has the characteristic of comprising the elastomer in accordance with the invention, a reinforcing filler and a crosslinking system.

The rubber composition can comprise any type of "reinforcing" filler known for its abilities to reinforce a rubber composition which can be used for the manufacture of tires, for example an organic filler, such as carbon black, a reinforcing inorganic filler, such as silica, with which is combined, in a known way, a coupling agent, or also a mixture of these two types of filler. Such a reinforcing filler typically consists of nanoparticles, the (weight-)average size of which is less than a micrometre, generally less than 500 nm, most often between 20 and 200 nm, in particular and more preferentially between 20 and 150 nm. The content of reinforcing filler is adjusted by a person skilled in the art according to the use of the rubber composition.

The crosslinking system can be based on sulfur, on sulfur donors, on peroxides, on bismaleimides or on their mixtures. The crosslinking system is preferentially a vulcanization system, that is to say a system based on sulfur (or on a sulfur-donating agent) and on a primary vulcanization accelerator. Additional to this base vulcanization system can be various known secondary vulcanization accelerators or vulcanization activators, such as zinc oxide, stearic acid or equivalent compounds, or guanidine derivatives (in particular diphenylguanidine), or also known vulcanization retarders.

The rubber composition can additionally contain other additives known to be used in rubber compositions for tires, such as plasticizers, antiozonants or antioxidants.

The rubber composition in accordance with the invention is typically manufactured in appropriate mixers, using two successive phases of preparation well known to a person skilled in the art: a first phase of thermomechanical working or kneading ("non-productive" phase) at high temperature, up to a maximum temperature of between 130° C. and 200° C., followed by a second phase of mechanical working ("productive" phase) down to a lower temperature, typically of less than 110° C., for example between 40° C. and 100° C., during which finishing phase the crosslinking system is incorporated.

The rubber composition in accordance with the invention, which can be either in the raw state (before crosslinking or vulcanization) or in the cured state (after crosslinking or vulcanization), can be used in a semi-finished article for a tire.

The tire, which is another subject-matter of the invention, comprises the rubber composition in accordance with the invention defined under any one of the embodiments of the invention.

To sum up, the invention is advantageously implemented according to any one of the following embodiments 1 to 35:

Embodiment 1: Terpolymer of ethylene, of a first 1,3-diene having from 4 to 6 carbon atoms and of a second 1,3-diene of formula (I), which terpolymer contains more than 50 mol % of ethylene units and at least 1 mol % of units of the second 1,3-diene, $$CH_2=CR\text{-}CH=CH_2 \quad (I)$$

the symbol R representing a hydrocarbon chain having from 3 to 20 carbon atoms.

Embodiment 2: Terpolymer according to embodiment 1, which terpolymer contains more than 60 mol % of ethylene units.

Embodiment 3: Terpolymer according to embodiment 1 or 2, which terpolymer contains at least 70 mol % of ethylene units.

Embodiment 4: Terpolymer according to any one of embodiments 1 to 3, which terpolymer contains at most 90 mol % of ethylene units.

Embodiment 5: Terpolymer according to any one of embodiments 1 to 4, which terpolymer contains at most 85 mol % of ethylene units.

Embodiment 6: Terpolymer according to any one of embodiments 1 to 5, which terpolymer contains at most 20 mol % of unit of the second 1,3-diene.

Embodiment 7: Terpolymer according to any one of embodiments 1 to 6, which terpolymer contains at most 10 mol % of unit of the second 1,3-diene.

Embodiment 8: Terpolymer according to embodiment 1, which terpolymer contains more than 60 mol % to 90 mol % of ethylene units and from 1 mol % to 20 mol %, preferentially from 1 mol % to 10 mol %, of units of the second 1,3-diene.

Embodiment 9: Terpolymer according to embodiment 1, which terpolymer contains from 70 mol % to 90 mol % of ethylene units and from 1 mol % to 20 mol %, preferentially from 1 mol % to 10 mol %, of units of the second 1,3-diene.

Embodiment 10: Terpolymer according to embodiment 1, which terpolymer contains more than 60 mol % to 85 mol % of ethylene units and from 1 mol % to 20 mol %, preferentially from 1 mol % to 10 mol %, of units of the second 1,3-diene.

Embodiment 11: Terpolymer according to embodiment 1, which terpolymer contains from 70 mol % to 85 mol % of ethylene units and from 1 mol % to 20 mol %, preferentially from 1 mol % to 10 mol %, of units of the second 1,3-diene.

Embodiment 12: Terpolymer according to any one of embodiments 8 to 10, which terpolymer contains less than 30 mol % of units of the first 1,3-diene.

Embodiment 13: Terpolymer according to any one of embodiments 8 to 11, which terpolymer contains less than 20 mol % of units of the first 1,3-diene.

Embodiment 14: Terpolymer according to any one of embodiments 1 to 13, in which first 1,3-diene is 1,3-butadiene, isoprene or a mixture of 1,3-dienes, one of which is 1,3-butadiene.

Embodiment 15: Terpolymer according to any one of embodiments 1 to 14, in which first 1,3-diene is 1,3-butadiene.

Embodiment 16: Terpolymer according to embodiment 14 or 15, which terpolymer additionally contains units of 1,2-cyclohexanediyl motif.

Embodiment 17: Terpolymer according to embodiment 16, which terpolymer contains less than 15 mol % of units of 1,2-cyclohexanediyl motif.

Embodiment 18: Terpolymer according to any one of embodiments 1 to 17, in which the symbol R represents a hydrocarbon chain having from 6 to 16 carbon atoms.

Embodiment 19: Terpolymer according to any one of embodiments 1 to 18, in which the symbol R represents a saturated or unsaturated chain.

Embodiment 20: Terpolymer according to any one of embodiments 1 to 19, in which the symbol R represents an aliphatic chain.

Embodiment 21: Terpolymer according to any one of embodiments 1 to 20, in which the symbol R represents an acyclic chain.

Embodiment 22: Terpolymer according to any one of embodiments 1 to 21, in which the symbol R represents a linear or branched chain.

Embodiment 23: Terpolymer according to any one of embodiments 1 to 22, which terpolymer has a glass transition temperature of less than −35° C.

Embodiment 24: Terpolymer according to any one of embodiments 1 to 23, which terpolymer has a glass transition temperature of between −70° C. and −35° C.

Embodiment 25: Terpolymer according to any one of embodiments 1 to 24, in which the second 1,3-diene is myrcene.

Embodiment 26: Terpolymer according to any one of embodiments 1 to 24, in which the second 1,3-diene is β-farnesene.

Embodiment 27: Terpolymer according to any one of embodiments 1 to 26, which terpolymer is a statistical terpolymer.

Embodiment 28: Terpolymer according to any one of embodiments 1 to 27, which terpolymer bears an amine, alkoxysilane or silanol functional group.

Embodiment 29: Terpolymer according to any one of embodiments 1 to 28, which terpolymer contains less than 80 mol % of ethylene unit.

Embodiment 30: Terpolymer according to any one of embodiments 1 to 29, which terpolymer contains at most 75 mol % of ethylene unit.

Embodiment 31: Rubber composition which comprises at least one terpolymer defined according to any one of embodiments 1 to 30, a reinforcing filler and a crosslinking system, which terpolymer is an elastomer.

Embodiment 32: Rubber composition according to embodiment 31, in which the reinforcing filler comprises a carbon black or a silica.

Embodiment 33: Rubber composition according to embodiment 31 or 32, in which the crosslinking system is a vulcanization system.

Embodiment 34: Tire which comprises a rubber composition defined according to any one of embodiments 31 to 33.

Embodiment 35: Process for preparing the terpolymer according to any one of embodiments 1 to 30, which comprises the polymerization of a mixture of ethylene, of the first 1,3-diene and of the second 1,3-diene in the presence of a catalytic system based at least on a metallocene of formula (II) and on an organomagnesium compound $$P(Cp^1Cp^2)Nd(BH_4)_{(1+y)}L_y\text{-}N_x \quad (II)$$

$$MgR^1R^2 \quad (III)$$

Cp¹ and Cp², which are identical or different, being selected from the group consisting of the cyclopentadienyl group of formula $C_5H_4$, the unsubstituted fluorenyl group of formula $C_{13}H_8$ and substituted fluorenyl groups, P being a group bridging the two Cp¹ and Cp² groups and representing a $ZR^3R^4$ group, Z representing a silicon or carbon atom, $R^3$ and $R^4$, which are identical or different, each representing an alkyl group comprising from 1 to 20 carbon atoms, preferably a methyl, y, which is an integer, being equal to or greater than 0, x, which is or is not an integer, being equal to or greater than 0, L representing an alkali metal selected from the group consisting of lithium, sodium and potassium, N representing a molecule of an ether, preferably diethyl ether or tetrahydrofuran, $R_1$ and $R^2$, which are identical or different, representing a carbon group.

A better understanding of the abovementioned characteristics of the present invention, and also others, will be obtained on reading the following description of several implementational examples of the invention, which are given by way of illustration and without limitation.

EXAMPLE

1) Determination of the macrostructure of thepPolymers by size exclusion chromatography (SEC):

a) Principle of the measurement:

Size exclusion chromatography or SEC makes it possible to separate macromolecules in solution according to their size through columns filled with a porous gel. The macromolecules are separated according to their hydrodynamic volume, the bulkiest being eluted first.

Combined with three detectors (3D), a refractometer, a viscometer and a 90° light scattering detector, SEC makes it possible to comprehend the distribution of the absolute molar masses of a polymer. The various number-average (Mn) and weight-average (Mw) absolute molar masses and the dispersity (Đ=Mw/Mn) can also be calculated.

b) Preparation of the polymer:

Each sample is dissolved in tetrahydrofuran at a concentration of approximately 1 g/l. The solution is then filtered through a filter with a porosity of 0.45 μm before injection.

c) 3D SEC analysis:

In order to determine the number-average molar mass (Mn), and if appropriate the weight-average molar mass (Mw) and the polydispersity index (PI), of the polymers, the method below is used.

The number-average molar mass (Mn), the weight-average molar mass (Mw) and the polydispersity index of the polymer (hereinafter sample) are determined in an absolute manner by triple detection size exclusion chromatography (SEC). Triple detection size exclusion chromatography exhibits the advantage of measuring average molar masses directly without calibration.

The value of the refractive index increment dn/dc of the solution of the sample is measured in line using the area of the peak detected by the refractometer (RI) of the liquid chromatography equipment. In order to apply this method, it must be confirmed that 100% of the sample mass is injected and eluted through the column. The area of the RI peak depends on the concentration of the sample, on the constant of the RI detector and on the value of the dn/dc.

In order to determine the average molar masses, use is made of the 1 g/l solution previously prepared and filtered, which is injected into the chromatographic system. The apparatus used is a Waters Alliance chromatographic line. The elution solvent is tetrahydrofuran containing 250 ppm of BHT (2,6-di(tert-butyl)-4-hydroxytoluene), the flow rate is 1 ml.min⁻¹, the temperature of the system is 35° C. and the analytical time is 60 min. The columns used are a set of three Agilent columns of PL Gel Mixed B LS trade name. The volume of the solution of the sample injected is 100 μl. The detection system is composed of a Wyatt differential viscometer of Viscostar II trade name, of a Wyatt differential refractometer of Optilab T-Rex trade name of wavelength 658 nm, and of a Wyatt multi-angle static light scattering detector of wavelength 658 nm and of Dawn Heleos 8+ trade name.

For the calculation of the number-average molar masses and the polydispersity index, the value of the refractive index increment dn/dc of the solution of the sample obtained above is integrated. The software for processing the chromatographic data is the Astra system from Wyatt.

2) Determination of the microstructure of the polymers:

a) Determination of the microstructure of the Ethylene-Butadiene-Myrcene terpolymers:

The spectral characterization and the measurements of the Ethylene-Butadiene-Myrcene copolymer microstructure are carried out by Nuclear Magnetic Resonance (NMR) spectroscopy.

For these measurements, a Bruker Avance III HD 400 MHz spectrometer is used, equipped with a Bruker cryo-BBFO z-grad 5 mm probe. The ¹H experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation) ¹H-¹³C NMR correlation experiments are recorded with a number of repetitions of 128 and a number of increments of 128. The experiments are carried out at 25° C. 25 mg of sample are dissolved in 1 ml of deuterated ortho-dichlorobenzene (ODCB).

The axes of the ¹H and ¹³C chemical shifts are calibrated with respect to the protonated impurity of the solvent at $\delta_{1H}$=7.2 ppm (for the most shielded signal) and $\delta_{13C}$=127 ppm (for the least shielded signal).

The possible monomer units in the terpolymer are —CH2-CH(CH=CH2)—, —CH2-CH=CH-CH2—, —CH₂-CH₂—, the 1,2-cyclohexanediyl motif and the following structures, $R_1$ and $R_2$ representing the polymer chain:

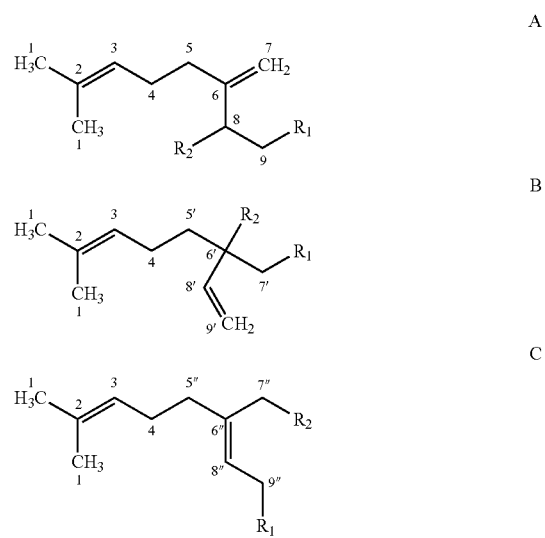

The 1,2-cyclohexanediyl motif has the following structure:

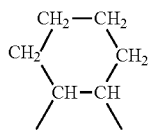

The signals of the insertion forms of myrcene A were observed on the different spectra recorded. According to S. Georges et al. (S. Georges, M. Bria, P. Zinck and M. Visseaux., Polymer, 55 (2014), 3869-3878), the signal of the —CH═ group No. 8" characteristic of the form C exhibits identical $^1$H and $^{13}$C chemical shifts to the —CH═ group No. 3.

The chemical shifts of the signals characteristic of the polymer are presented in Table 1 (Assignment of the $^1$H and $^{13}$C signals of the Ethylene-Butadiene-Myrcene terpolymers other than those of the units of the 1,3-butadiene).

TABLE 1

| $\delta_{1H}$ (ppm) | $\delta_{13C}$ (ppm) | Group |
|---|---|---|
| 5.19 | 125.1 | 3 + 8" |
| 4.86 | 109.0 | 7 |
| 1.59 and 1.68 | 247 and 17.6 | 1 |
| 1.3 | 37.5-24.0 | ethylene CH$_2$ |

The quantifications were carried out from the integration of the 1D $^1$H NMR spectra using the Topspin software.

The integrated signals for the quantification of the different motifs are:

Ethylene: All of the signals between 0.5 ppm and 3.0 ppm by subtracting the aliphatic contributions of the other motifs of the terpolymer. The calculation corresponds to 4 protons of the Ethylene motif.

Form A: signal No. 7 (4.86 ppm) corresponding to 2 protons.

The proportion of form C is not directly accessible but can be calculated from the signal No.3+8" by subtracting the contribution of the form A.

PB1-4: Signal between 5.71 ppm and 5.32 ppm corresponds to 2 protons (by removing the PB1-2 contribution).

PB1-2: signal between 5.11 ppm and 4.92 ppm corresponds to 2 protons.

Cyclohexane rings: signal between 1.80 ppm and 1.70 ppm corresponds to 2 protons.

The quantification of the microstructure is carried out in molar percentage (molar %) as follows:

molar % of a motif=$^1$H integral of a motif*100/Σ($^1$H integrals of each motif).

b) Determination of the microstructure of the ethylene-butadiene-farnesene terpolymers:

The spectral characterization and the measurements of the ethylene-butadiene-farnesene copolymer microstructure are carried out by Nuclear Magnetic Resonance (NMR) spectroscopy. For these measurements, a Bruker Avance III HD 400 MHz spectrometer is used, equipped with a Bruker cryo-BBFO z-grad 5 mm probe. The $^1$H experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation) $^1$H-$^{13}$C NMR correlation experiments are recorded with a number of repetitions of 128 and a number of increments of 128. The experiments are carried out at 25° C. 25 mg of sample are dissolved in 1 ml of deuterated ortho-dichlorobenzene (ODCB). The axes of the $^1$H and $^{13}$C chemical shifts are calibrated with respect to the protonated impurity of the solvent at $\delta_{1H}$=7.2 ppm (for the most shielded signal) and $\delta_{13C}$=127 ppm (for the least shielded signal).

The possible monomer units in the terpolymer are —CH2-CH(CH═CH2)—, —CH$_2$-CH═CH-CH$_2$—, —CH$_2$-CH$_2$—, the 1,2-cyclohexanediyl motif and the following structures, R$_1$ and R$_2$ representing the polymer chain:

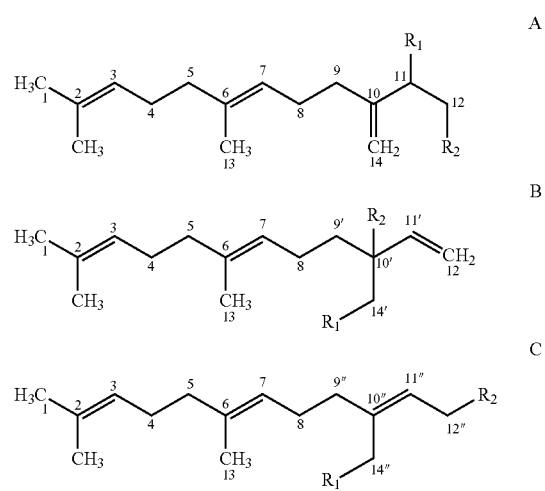

The signals of the insertion form of farnesene A were observed on the different spectra recorded. The signal of the —CH═ group No. 11" characteristic of the form C exhibits identical $^1$H and $^{13}$C chemical shifts to the —CH═ groups No. 3 and No. 7.

The chemical shifts of the signals characteristic of the polymer are presented in Table 2 (Assignment of the $^1$H and $^{13}$C signals of the Ethylene-Butadiene-Farnesene terpolymers other than those of the units of the 1,3-butadiene).

TABLE 2

| $\delta_{1H}$ (ppm) | $\delta_{13C}$ (ppm) | Group |
|---|---|---|
| 5.25 | 125.0 | 7 |
| 5.15 | 125.0 | 3, 11" |
| 4.87 | 109.0 | 14 |
| 1.59 and 1.67 | 24.6 and 17.5 | 1, 13 |
| 1.28 | 38-24.0 | ethylene CH$_2$ |

The quantifications were carried out from the integration of the 1D $^1$H NMR spectra using the Topspin software.

The integrated signals for the quantification of the different motifs are:

Farnesene motif form A from the signal No. 14 CH$_2$═for 2 protons,

Farnesene motif form C from the signals No. 3, 11" and No. 7 CH═(by subtracting the contribution of the form A), for 2 protons, Farnesene motif form B: from the signal No. 11', specific to this form, for 1 proton.

PB1-4: Signal between 5.71 ppm and 5.32 ppm corresponds to 2 protons (by removing the PB1-2 contribution).

PB1-2: signal between 5.11 ppm and 4.92 ppm corresponds to 2 protons.

Cyclohexane rings: signal between 1.80 ppm and 1.70 ppm corresponds to 2 protons.

Ethylene motif by integrating all of the aliphatic signals (from ~0.5 to 3 ppm) and by subtracting the contribution of all the other aliphatic motifs (PB1-4, PB1-2, EBR ring, farnesene forms A and C).

The quantification of the microstructure is carried out in molar percentage (molar %) as follows:

molar % of a motif=$^1$H integral of a motif*100/Σ($^1$H integrals of each motif).

3) Determination of the glass transition temperature of the polymers:

The glass transition temperature is measured by means of a differential calorimeter (differential scanning calorimeter) according to Standard ASTM D3418 (1999).

4) Determination of the stiffness of the polymers (in the raw state):

The measurements are carried out on an Anton Paar model MCR301 rheometer in shear mode with cylindrical test specimens of controlled geometry (thickness of between 1.5 mm and 3 mm and diameter of between 22 mm and 28 mm). The sample is subjected to a sinusoidal shear stress, at a fixed temperature (corresponding to the end of the passage of the glass transition of the elastomer over a temperature sweep at 10 Hz), and over a frequency range extending from 0.01 Hz to 100 Hz. The stiffness value selected as being the stiffness of the rubbery plateau of the sample is the value of the shear modulus G' for the frequency at which the loss modulus G" reaches its minimum, in accordance with the method described by C. Liu, J. He, E. van Ruymbeke, R. Keunings and C. Bailly, Evaluation of different methods for the determination of the plateau modulus and the entanglement molecular weight, Polymer, 47 (2006), 4461-4479.

5) Determination of the degree of crystallinity of the polymers:

Standard ISO 11357-3:2011 is used to determine the temperature and enthalpy of fusion and of crystallization of the polymers used by differential scanning calorimetry (DSC). The reference enthalpy of polyethylene is 277.1 J/g (according to Polymer Handbook, 4th Edition, J. Brandrup, E. H. Immergut and E. A. Grulke, 1999).

6) Synthesis of the polymers:

In the synthesis of the terpolymers in accordance with the invention, the first 1,3-diene used is 1,3-butadiene and the second 1,3-diene is myrcene or β-farnesene. Myrcene is a 1,3-diene of formula (I) in which R is a hydrocarbon group having 6 carbon atoms of formula $CH_2$-$CH_2$-CH=$CMe_2$.

All the reactants are obtained commercially, except the metallocenes [{$Me_2$SiFlu$_2$Nd(μ-$BH_4$)$_2$Li(THF)}] and [$Me_2$SiCpFluNd(μ-$BH_4$)$_2$Li(THF)], which are prepared according to the procedures described in Patent Applications WO 2007054224 and WO 2007054223.

The butyloctylmagnesium BOMAG (20% in heptane, C=0.88 mol l$^{-1}$) originates from Chemtura and is stored in a Schlenk tube under an inert atmosphere. The ethylene, of N35 grade, originates from Air Liquide and is used without prepurification. The myrcene (purity ≥95%) is obtained from Sigma-Aldrich.

Example 1 not in accordance with the invention: synthesis of a copolymer of ethylene and of 1,3-butadiene The polymer is synthesized according to the following procedure:

The cocatalyst, the butyloctylmagnesium (BOMAG) and then the metallocene [$Me_2$SiCpFluNd(μ-$BH_4$)$_2$Li(THF)] are added to a 500-ml glass reactor containing 300 ml of toluene. The alkylation time is 10 minutes and the reaction temperature is 20° C. The respective amounts of the constituents of the catalytic system appear in Table 3. Subsequently, the monomers are added according to the respective proportions shown in Table 3, the ethylene (Eth) and the 1,3-butadiene (Bde) being in the form of a gaseous mixture. The polymerization is carried out at 80° C. and at a constant ethylene pressure of 4 bar.

The polymerization reaction is halted by cooling, degassing of the reactor and addition of 10 ml of ethanol. An antioxidant is added to the polymer solution. The copolymer is recovered by drying in an oven under vacuum to constant weight.

Example 2 not in accordance with the invention: synthesis of a copolymer of ethylene and of 1,3-butadiene The polymer is synthesized according to the following procedure:

The cocatalyst, the butyloctylmagnesium (BOMAG) and then the metallocene [$Me_2$Si(Flu)$_2$Nd(μ-$BH_4$)$_2$Li(THF)] are added to a 500-ml glass reactor containing 300 ml of methylcyclohexane. The alkylation time is 10 minutes and the reaction temperature is 20° C.

The respective amounts of the constituents of the catalytic system appear in Table 3. Subsequently, the monomers are added according to the respective proportions shown in Table 3, the ethylene (Eth) and the 1,3-butadiene (Bde) being in the form of a gaseous mixture. The polymerization is carried out at 80° C. and at a constant ethylene pressure of 4 bar.

The polymerization reaction is halted by cooling, degassing of the reactor and addition of 10 ml of ethanol. An antioxidant is added to the polymer solution. The copolymer is recovered by drying in an oven under vacuum to constant weight.

Example 3 not in accordance with the invention: synthesis of a copolymer of ethylene and of 1,3-butadiene The polymer is synthesized according to the following procedure:

The cocatalyst, the butyloctylmagnesium (BOMAG) and then the metallocene [$Me_2$Si(Flu)$_2$Nd(μ-$BH_4$)$_2$Li(THF)] are added to a reactor containing methylcyclohexane. The alkylation time is 10 minutes and the reaction temperature is 20° C. The respective amounts of the constituents of the catalytic system appear in Table 3.

The monomers are subsequently added continuously according to the respective amounts shown in Table 3. The polymerization is carried out at 80° C. and at a constant pressure of 4 bar. The polymerization reaction is halted by cooling, degassing of the reactor and addition of ethanol. An antioxidant is added to the polymer solution. The copolymer is recovered by drying in an oven under vacuum to constant weight.

Examples 4 to 10 in accordance with the invention: terpolymers of ethylene, of 1,3-butadiene and of myrcene or of β-farnesene The polymers are synthesized according to the following procedure:

The cocatalyst, the butyloctylmagnesium (BOMAG) and then the metallocene [$Me_2$Si(Flu)$_2$Nd(μ-$BH_4$)$_2$Li(THF)] are added to a reactor containing the hydrocarbon solvent: methylcyclohexane (MCH). The alkylation time is 10 minutes and the reaction temperature is 20° C.

The polymerization is carried out at 80° C. and at a constant pressure of 4 bar in a 500-ml glass reactor containing 300 ml of polymerization solvent, the methylcyclohexane, the catalytic system and the monomers, the myrcene (Myr) or the β-farnesene (Far) being introduced in liquid form into the reactor and the ethylene/1,3-butadiene being introduced in gaseous form. The polymerization reaction is halted by cooling and degassing the reactor. The copolymer is recovered by precipitation from methanol and then dried, or by direct drying.

The respective amounts of the constituents of the catalytic system, the composition of the gaseous mixture in ethylene and in 1,3-butadiene in the feed and the amount of myrcene or of β-farnesene appear in Table 4.

7) Results:

The characteristics of the polymers synthesized appear in Tables 5 and 6.

The elastomers of Examples 4 to 9 have a much lower degree of crystallinity than the elastomer of Example 1, even though they exhibit a comparable or indeed higher content of ethylene unit. Even the elastomers of Examples 7 and 10, which have a content of ethylene unit of greater than 80%, exhibit a much lower degree of crystallinity than the elastomer of Example 1, which is nevertheless much less rich in ethylene unit.

The comparison of Examples 4, 6 and 8 with Example 2 furthermore shows that the insertion of units of the second 1,3-diene into the polymer at contents in accordance with the invention makes it possible to reduce the stiffness of the polymer, while the contents of ethylene unit are comparable.

The comparison of Examples 5 and 9 with Example 2 furthermore shows that the insertion of units of the second 1,3-diene at contents as low as 1% makes it possible to reduce the stiffness of the elastomer, even though the elastomers of Examples 5 and 9 have a content of ethylene units as high as that of Example 2. The elastomers of Examples 5 and 9 also have a lower degree of crystallinity than that of the elastomer of Example 3, which exhibits a similar content of ethylene unit.

The presence in an ethylene-rich diene copolymer of units of a 1,3-diene of formula (I) in the contents in accordance with the invention makes it possible to improve the compromise between the content of ethylene units in the polymer, the degree of crystallinity and the stiffness of the polymer.

TABLE 3

| Ex. | Metallocene (mmol/l) | Alkylating agent (mmol/l) | Gaseous mixture composition (mol % Eth/Bde) |
|---|---|---|---|
| 1 | 0.32 | 0.97 | 80/20 |
| 2 | 0.16 | 0.78 | 70/30 |
| 3 | 0.15 | 0.75 | 80/20 |

TABLE 4

| Ex. | Metallocene (mmol/l) | Alkylating agent (mmol/l) | Gaseous mixture composition (mol % Eth/Bde) | Volume of Myr | Volume of Far | Mn (g/mol) | PI |
|---|---|---|---|---|---|---|---|
| 4 | 0.00015 | 0.00047 | 80/20 | 5 | | 92500 | 1.7 |
| 5 | 0.00015 | 0.00047 | 80/20 | 1 | | 105200 | 1.7 |
| 6 | 0.00015 | 0.00047 | 80/20 | 10 | | 112900 | 2.0 |
| 7 | 0.00015 | 0.00047 | 90/10 | 5 | | — | — |
| 8 | 0.00015 | 0.00047 | 80/20 | | 5 | 103300 | 1.8 |
| 9 | 0.00015 | 0.00047 | 80/20 | | 1 | 94000 | 1.6 |
| 10 | 0.00015 | 0.00047 | 90/10 | | 3 | — | — |

TABLE 5

| Ex. | Eth unit (mol %) | Bde unit (mol %) | 1,2-Cyclohexanediyl motif (mol %) | Tg (° C.) | Crystallinity | Stiffness in the raw state |
|---|---|---|---|---|---|---|
| 1 | 73.5 | 26.5 | | −54 | 31 | — |
| 2 | 71 | 16 | 13 | −35 | 0 | 1 |
| 3 | 76.7 | 11.4 | 11.9 | −38 | 2.1 | — |

TABLE 6

| Ex. | Eth unit (mol %) | Bde unit (mol %) | Myr unit (mol %) | Far unit (mol %) | 1,2-Cyclohexanediyl motif (mol %) | Tg (° C.) | Crystallinity | Stiffness in the raw state |
|---|---|---|---|---|---|---|---|---|
| 4 | 70 | 12 | 7 | | 11 | −47 | 0% | 0.8 |
| 5 | 75 | 12 | 1 | | 12 | −39 | 0.7% | 0.9 |
| 6 | 71 | 11 | 9 | | 9 | −48 | 0% | 0.7 |
| 7 | 82 | 5 | 6 | | 7 | −47 | 10.9% | — |
| 8 | 72 | 12 | | 5 | 11 | −49 | 0.6% | 0.8 |
| 9 | 74 | 13 | | 1 | 12 | −39 | 0% | 0.9 |
| 10 | 85 | 5 | | 3 | 7 | −44 | 14.9% | — |

The invention claimed is:

1. A terpolymer of ethylene, of a first 1,3-diene having from 4 to 6 carbon atoms and of a second 1,3-diene of formula (I), which terpolymer contains more than 50 mol % of ethylene units and at least 1 mol % of units of the second 1,3-diene, $$CH_2=CR\text{-}CH=CH_2 \qquad (I)$$

the symbol R representing a hydrocarbon chain having from 3 to 20 carbon atoms.

2. The terpolymer according to claim 1, which terpolymer contains more than 60 mol % of ethylene units.

3. The terpolymer according to claim 1, which terpolymer contains at most 90 mol % of ethylene units.

4. The terpolymer according to claim 1, which terpolymer contains at most 20 mol % of unit of the second 1,3-diene.

5. The terpolymer according to claim 2, which terpolymer contains less than 30 mol % of unit of the first 1,3-diene or less than 20 mol % of unit of the first 1,3-diene.

6. The terpolymer according to claim 1, which terpolymer contains less than 80 mol % of ethylene unit.

7. The terpolymer according to claim 1, which terpolymer contains at most 75 mol % of ethylene unit.

8. The terpolymer according to claim 1, in which the first 1,3-diene is 1,3-butadiene or isoprene.

9. The terpolymer according to claim 1, which terpolymer additionally contains units of 1,2-cyclohexanediyl motif and in which the first 1,3-diene is 1,3-butadiene or a mixture of first 1,3-dienes, one of which is 1,3-butadiene.

10. The terpolymer according to claim 1, in which the symbol R represents a hydrocarbon chain having from 6 to 16 carbon atoms.

11. The terpolymer according to claims 1, in which the symbol R represents an acyclic chain.

12. The terpolymer according to claim 1, in which the second 1,3-diene is myrcene or β-farnesene.

13. The terpolymer according to claim 1, which terpolymer is a statistical terpolymer.

14. The terpolymer according to claim 1, which terpolymer bears an amine, alkoxysilane or silanol functional group.

15. A rubber composition which comprises at least one terpolymer defined according to claim 1, a reinforcing filler and a crosslinking system, which terpolymer is an elastomer.

16. A tire which comprises a rubber composition defined according to claim 14.

17. A process for preparing the terpolymer according to claim 1, which comprises the polymerization of a mixture of ethylene, of the first 1,3-diene and of the second 1,3-diene in the presence of a catalytic system based at least on a metallocene of formula (II) and on an organomagnesium compound $$P(Cp^1Cp^2)\ Nd(BH_4)_{(1+y)}L_y\text{-}N_x \qquad (II)$$

$$MgR^1R^2 \qquad (III)$$

$Cp^1$ and $Cp^2$, which are identical or different, being selected from the group consisting of the cyclopentadienyl group of formula $C_5H_4$, the unsubstituted fluorenyl group of formula $C_{13}H_8$ and substituted fluorenyl groups, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, y, which is an integer, being equal to or greater than 0, x, which is or is not an integer, being equal to or greater than 0, L representing an alkali metal selected from the group consisting of lithium, sodium and potassium, N representing a molecule of an ether, $R^1$ and $R^2$, which are identical or different, representing a carbon group.

* * * * *